Patented June 7, 1949

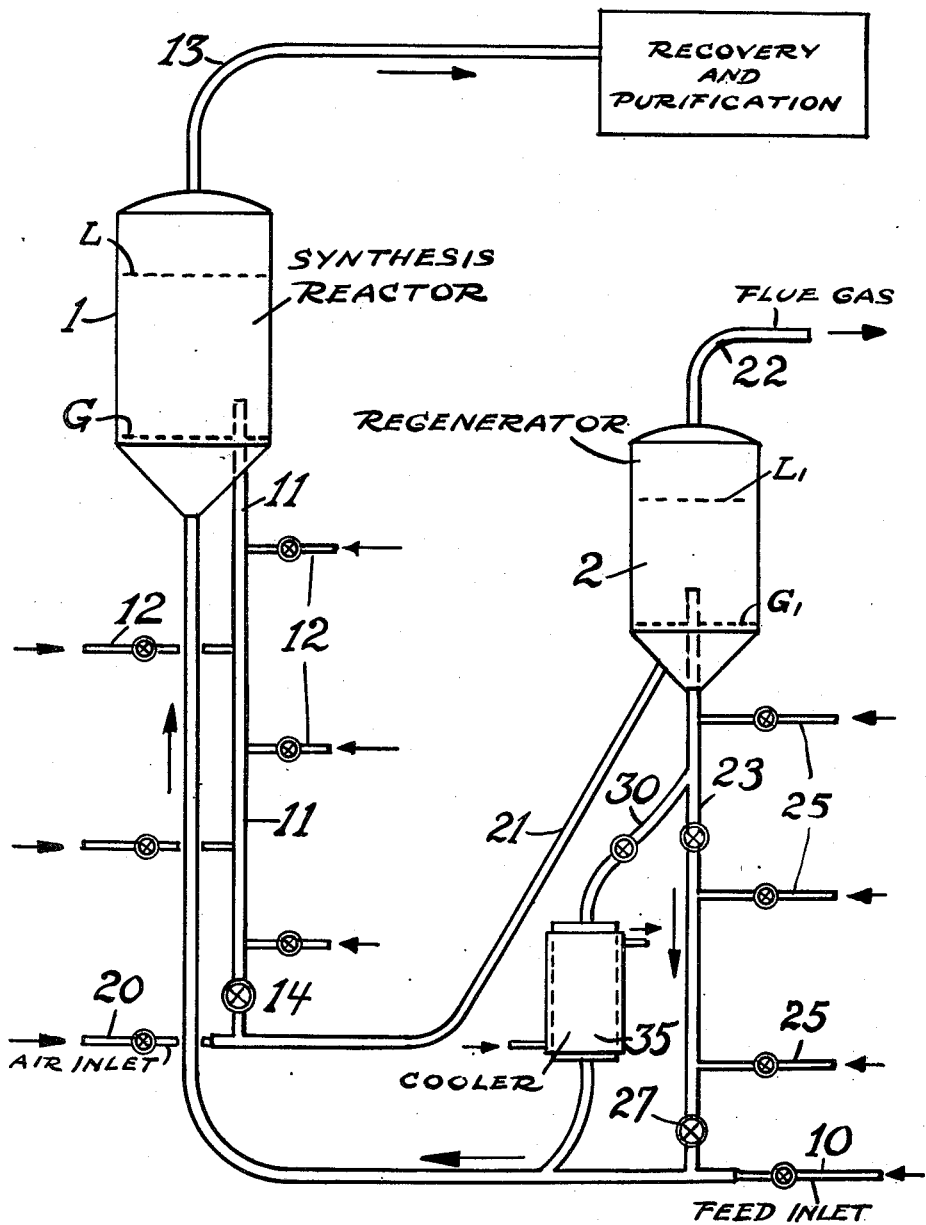

2,472,501

UNITED STATES PATENT OFFICE 2,472,501

PROCESS OF REGENERATING SYNTHESIS CATALYST WITH OXYGEN AND RETURN OF OXIDIZED CATALYST TO THE SYNTHESIS REACTOR

Sumner B. Sweetser, Baton Rouge, La., assignor to Standard Oil Development Company, a corporation of Delaware Application December 20, 1945, Serial No. 636,248

3 Claims. (Cl. 260—449.6)

My present invention is fully disclosed in the following specification and claims and illustrated in the accompanying drawings forming a part of the specification.

At the present time in this country a great deal of research is being directed towards preparing hydrocarbons boiling in the gasoline boiling range, the gas oil boiling range, and heavier hydrocarbons from carbon monoxide and hydrogen. This type of process is referred to as hydrocarbon synthesis, and the object of most experimenters employed by the larger companies is to provide for that contingency which may happen sooner than expected wherein the petroleum reserve of this country descends to a level where the expected exhaustion thereof may be a foreseeable and not too distant eventuality. So far as is known, no great amount of hydrocarbon oils has been produced synthetically in this country. However, the production of synthetic oils has been practiced on a large scale abroad. One such process which has gained considerable attention is the so-called Fischer-Tropsch process, in which a mixture of about two mols of hydrogen per mol of carbon monoxide are caused to react at elevated temperatures in the presence of a catalyst consisting predominantly of kieselguhr, carrying thereon an active component such as cobalt and a relatively small amount of a promoter such as thoria. Insofar as is known, this operation was carried out in a reactor containing a stationary bed or beds of catalyst and the product obtained consisted chiefly of normally gaseous hydrocarbons, straight chain paraffinic hydrocarbons and paraffin wax. The gasoline fractions therefore were of poor quality from the standpoint of anti-detonation properties. Furthermore, the gas oil being a straight chain paraffinic material was not the best feed stock for a catalytic cracking operation for such stocks preferably contain naphthenic hydrocarbons in substantial quantities. There has been developed also, at least experimentally, a type of hydrocarbon synthesis in which the catalyst is iron. This type of operation is usually carried out at somewhat higher temperatures and pressures than those employed where the catalyst is a supported cobalt material. The gasoline fractions obtained with iron catalyst are of higher quality than those obtained with cobalt catalyst so that the product of the synthesis operation can be used as motor fuel after only minor refining operations. In fact, the knock characteristics of the motor fuel fractions obtained from synthesis with iron catalyst are such that they can be used in many cases without the addition of lead tetraethyl for increasing the octane rating. My present improvement relates to the latter type of operation, mainly a hydrocarbon synthesis in which the catalyst is iron, and furthermore, my improvements go to the matter of regenerating that catalyst which during operation becomes contaminated with sulfur and/or carbonaceous deposits.

There have been developed during recent years in this country on a commercial scale, types of catalytic chemical processes in which the catalyst is a solid powdered material and in which the reactants are in gas and/or vapor phase. In the type of operation referred to the catalyst is suspended in the gaseous reactants to form a dense turbulent, ebullient mass of catalyst in gas or vapors. This type of operation is commonly referred to as the fluid catalyst operation or a fluid solid operation where the solid material is not catalytic. In particular, my improvements go to the matter of regenerating powdered catalyst which has become contaminated in a fluid catalyst type of hydrocarbon synthesis.

An object of my present invention is to regenerate with an oxygen-containing gas a powdered metal containing catalyst contaminated in a fluid catalyst type of operation conducted in the presence of hydrogen or other reducing gases and immediately after regeneration of the catalyst, to re-use it without reduction in the productive phase of the operation.

A more particular object of my invention is to regenerate an iron catalyst in the form of the powder and which has become contaminated in the productive phase of a fluidized mass of said catalyst employed in a hydrocarbon synthesis operation.

Other and further objects of my invention will appear from the following more detailed description.

Catalysts used in hydrocarbon synthesis from carbon monoxide and hydrogen gradually accumulate contaminants such as sulfur and carbon either in free or combined state. These contaminants cannot be removed conveniently by solvent extraction or other low temperature operations. However, it has been found that these contaminants can be removed by oxidation at temperatures somewhat above normal synthesis temperatures. Furthermore, it has been found that when both synthesis and regeneration are carried out in a fluid catalyst operation, the regenerated catalyst may be returned to the reactor without intermediate reduction with hydrogen.

The foregoing regeneration is best applied to the iron type of catalyst which operates in a comparatively high temperature range. The catalyst is removed from the fluid synthesis reactor either intermittently, or continuously at a slow rate, and transferred to a second fluid type reactor where it is contacted with air or other oxygen-containing gas at a suitable temperature to remove the contaminants by oxidation. The oxidized catalyst is then cooled to synthesis temperatures. However, when the oxidized catalyst is returned to the reactor at a very low rate, cooling of the catalyst may be unnecessary. Complete cycles of operation may be carried out with the catalyst in a fluidized condition. Since the catalyst accumulates the contaminants at a very low rate, the regeneration can be carried out intermittently. If carried out continuously the regenerator should be of much smaller capacity than the reactor. This type of oxidative regeneration may be carried out in combination with other kinds of regeneration such as solvent extraction, if desired. The regenerated catalyst should be returned to the reactor at a comparatively slow rate so that the ratio of oxidized to reduced catalyst will be low at all times and the oxidized material will gradually be converted to a reduced form.

It has been found that, if unreduced iron catalyst is contacted with a mixture of carbon monoxide and hydrogen under synthesis conditions, some conversion to hydrocarbon is obtained. The rate of conversion is very low initially, but increases gradually in the course of several days until a satisfactory conversion and yield of liquid hydrocarbons are obtained. While it is impractical to start with a complete charge of unreduced catalyst, it has been found that, if a small portion of unreduced catalyst is gradually or intermittently mixed with a larger amount of reduced catalyst, reduction of the oxidized material is effected and the catalyst mixture continues to give satisfactory conversion and yield. The continuous or intermittent introduction of small amounts of oxidized catalyst to reduced catalyst is impractical for fixed bed operation. However, in the fluid type operation with which this invention is concerned, the desired mixing of the reduced and unreduced catalyst is readily accomplished. It is desirable to regulate the rate of return of oxidized regenerated catalyst to a value of less than about 2% per hour of the total weight of catalyst in the reactor.

Iron catalysts used for the synthesis of hydrocarbons are generally promoted with a small amount of an alkali metal compound or a larger amount of copper. These catalysts may be used in either supported or unsupported form, but for the present invention the latter type is preferred. A suitable catalyst may be prepared by oxidizing powdered iron in a current of air or other oxygen-containing gas to an oxygen content of 15% or higher. The oxidized material is then impregnated with a small amount, for example, 0.5 to 1.0% of an alkali metal compound such as sodium carbonate. The impregnated material is dried and is then reduced, preferably in a fluidized condition, in a stream of hydrogen at a temperature of 700° F. or higher for a period of at least 4 hours. Instead of oxidizing metallic iron, naturally occurring oxides of iron of reasonable purity may be used as the base material if desired.

In the accompanying drawing there is shown diagrammatically an apparatus layout in which a preferred modification of my invention may be carried into effect.

Referring in detail to the drawing, 1 represents a fluid-type reactor, comprising a cylindrical shell with a conical base and a dome crown-piece and having disposed at near the bottom of the cylindrical section a screen grid or other reticulated member. This member is designated as G. 2 is a regenerator of the fluid type also provided with a screen or grid $G_1$. At this stage of the development of the fluid catalyst technique, so-called, it is not necessary to go into a too lengthy description of the theory of the technique. In general, of course, a powdered catalyst is suspended in gaseous or vaporous reactants in the reaction zone, the gas or vapor flowing upwardly at a superficial velocity of from 0.2 to 1.5 to 2.0 feet per second, where the catalyst particle size is from about 5 to 300 microns. Sufficient catalyst is charged to the reactor so that a dense turbulent suspension of powdered catalyst in the reactor is formed. In the case of hydrocarbon synthesis using an iron catalyst, the fluidized catalyst forms with the gases and/or vapors in either the synthesis reactor 1 or regenerator 2, a suspension weighing from 20 to 175 lbs./cu. ft. approximately. The density of the catalyst suspension will vary with the density of the unaerated or non-fluidized catalyst (free settling density) as well as with the operating conditions, such as superficial linear velocity and pressure within the reactor. A supported catalyst will normally give a suspension of lower density than an unsupported catalyst. In general, it may be stated that the density of the suspension in the reactor will be from 30 to 95% of the density of the unaerated material or its free settling density. In the instant case the feed of CO and hydrogen proportioned in the ratio of about 1 mol of hydrogen per mol of CO enters the system through line 10 mixed in the proportions indicated and then discharges into the bottom of reactor 1, thereafter passes upwardly through the grid G and into the reactor 1 containing the fluidized mass of catalyst previously referred to. As previously indicated, the gas velocities are controlled so that they are in the range of from 0.2 to 2.0 feet per second, preferably from 0.3 to 0.6 feet per second, depending on the pressure in the reactor and the time of contact desired, whereupon a delayed settling results with the formation of the dense suspension previously referred to. Depending upon the actual amount of catalyst charged to the reactor and the size thereof, the dense suspension will have an upper dense phase level at some point L above which the concentration of catalyst in gas or vapors decreases sharply. In other words, the reactor is not filled with catalyst, for purposely there is a disengaging space between L and the upper portion or crown of the reactor wherein entrained catalyst is permitted to gravitate out of the gases exiting through line 13. It is customary practice to dispose in the crown-piece or in the upper part of the reactor 1, one or more, preferably several, centrifugal separators commonly called "cyclones" through which the dilute suspension is forced for the purpose of removing the last traces of catalyst so that the vapors issuing through line 13 will be substantially freed of entrained catalyst. In order to aid this freeing of catalyst from the vapors, however, it is also common practice to dispose in line 13 one or more electrical precipitators to complete the substantial removal of entrained catalyst. The hydrocarbons formed in the reactor 1 are produced under conditions which will be subsequently set forth more fully hereinafter. Suffice it to say for the present that hydrocarbons are formed and withdrawn through line 13, and these proceed to a recovery and purification system, more or less conventional in design, wherein gasoline and/or naphtha fractions of good octane number are recovered.

It will be recalled that the point of this invention is to regenerate the catalyst by means of air or other free oxygen-containing gas. The nature of the synthesis reaction is such that relatively small amounts of carbon, coke, wax or sulfur compounds are deposited on the catalyst. That is to say, compared with catalytic cracking or catalytic reforming, the amount of deposit found on the catalyst in a given period of time is relatively small and, therefore, unlike the vessels used in catalytic cracking or reforming, regenerator 2 may be of substantially smaller capacity than reactor 1. Intermittently, or continuously at a low rate, however, catalyst is withdrawn from reactor 1 by draw-off pipe 11 controlled by valve 14. In order to improve the fluidity and flow characteristics of the catalyst in line 11 as well as to remove some of the adsorbed products of synthesis from the catalyst, a gaseous material (e. g., methane, ethane, etc.) is injected at several points 12 into draw-off line 11, in known manner. The catalyst withdrawn from reactor 1 is picked up in air or other oxygen-containing gas introduced into the system through line 20 wherein it forms a suspension which is carried by line 21 into the bottom of the regenerator up through grid G1 and into the main portion of the regeneration vessel 2. Here also the gas velocity is limited to within say from 0.2 to 3.0 feet per second, preferably from 0.3 to 1.5 feet per second, to form in the regenerator a dense, turbulent suspension of catalyst in regeneration gas, which suspension has an upper level at L1 which level is determined by the amount of catalyst actually fed into the regenerator. As before, in the case of reactor 1, above L1 there is a disengaging space in which one or more centrifugal separators may be disposed through which the exit flue gases are forced for the purpose of separating out entrained catalyst. The regeneration fumes exit through line 22 and ordinarily are forced through electrical precipitators or the like for the purpose of separating the last traces of the catalyst. The flue gases which may be at a temperature of around 1000° F. more or less, may be passed through a waste heat boiler (not shown) for the purpose of recovering at least a portion of their sensible heat.

The regenerated catalyst is withdrawn from regenerator 2 through standpipe 23 containing bleed lines 25 through which a reducing or inert gas such as hydrogen, nitrogen or carbon dioxide is introduced to maintain the catalyst in the standpipe in a fluidized state as well as to strip oxidizing gases from the catalyst. If desired, additional stripping facilities may be used in order to prevent the transfer of oxidizing gas from the regenerator to the feed line 10 and to the reactor 1. The regenerated catalyst is discharged through valve 27 in the bottom of standpipe 23 and is picked up by the entering feed in line 10. Some cooling of the catalyst before it contacts the entering feed is preferable so that the mixture of synthesis gas and catalyst discharging from the feed inlet line 10 into the reactor 1 is only slightly above the temperature in the main body of the catalyst in reactor 1. Hence regenerated catalyst preferably passes through leg 30 and cooler 35 where it is cooled to about 600° F. before returning to the reactor.

In order to explain my invention further and the best manner in which it may be performed, I set forth below operating conditions:

*Reactor*

| | Broad | Preferred |
|---|---|---|
| Temperature, °F | 375–700 | 550–650 |
| Pressure, p. s. i. g. | 0–750 | 100–350 |
| Synthesis Gas Rate, V./V./Hr.[1] | 100–3000 | 300–1000 |
| Superficial Vel., ft./sec | 0.2–1.5 | 0.3–0.6 |
| Catalyst Density, lb./cu. ft | 20–175 | |
| $H_2/CO$ Ratio in Feed | 0.5–3/1 | 0.75–1.25/1 |

*Regenerator*

| | Broad | Preferred |
|---|---|---|
| Temperature, °F | 600–1100 | 700–1000 |
| Pressure, p. s. i. g. | 0–750 | 100–350 |
| Superficial Vel. of Air, ft./sec | 0.2–1.5 | 0.3–0.6 |
| Catalyst Density, lb./cu. ft | 20–175 | |

[1] Volumes of gas per hour per volume of unaerated catalyst.

It will be understood that exit gas from the reactor may be recycled to the reactor in order to obtain the desired conversion as well as to maintain a suitable superficial velocity within the reactor. The gas recycled is preferably treated for removal of part of the condensable products. Ratios of recycled to fresh feed in the range of 0 to 10 are contemplated. As indicated previously the catalyst concentration in the reactor will depend on both the type of the catalyst as well as on the operating conditions used. However, in most cases the density of the suspension will be from 30 to 95% of the density of the unaerated catalyst.

Since the contaminants accumulate on the catalyst at a very slow rate, regeneration of the entire body of the catalyst is required only at infrequent intervals. For example, the rate of regeneration may be such that all of the catalyst is passed through the regenerator in from 3 to 30 days. While the useful life of the catalyst is considerably greater than this period, regeneration at the designated intervals is desirable in order to maintain the catalyst at a high degree of activity. It will be obvious that the desired rate of regeneration may be accomplished by the intermittent operation of a regeneration vessel of relatively large size or by continuous operation of a vessel of much smaller size. In either case the regenerator will have a smaller holding capacity than the reactor. It is advantageous to operate the regenerator at essentially the same pressure level as the reactor in order to avoid pressuring and depressuring of the catalyst. While the rate at which the air is supplied to the regenerator can be varied over a considerable range, it is preferable to use sufficient air to give a superficial velocity in the regenerator of 0.2 to 1.5 feet per second as measured under operating conditions and to adjust the catalyst rate to give the desired amount or extent of regeneration.

While the invention can be practiced over the temperature range indicated in the table, it is preferred to operate in the higher temperature range, for example, from 600 to 650° F., since the oxidized catalyst reaches a high level of activity with synthesis gas in a shorter time in this high temperature range.

To recapitulate briefly, the present invention relates to a method of regenerating the catalyst used in a hydrocarbon synthesis by causing combustion of catalyst contaminants thereon with air or other oxygen-containing gas and removal of said contaminants. Insofar as I am aware, this is a departure from known procedure for usually the catalyst in this type of operation is washed with a solvent or treated with hydrogen to remove the waxy and/or carbonaceous materials which are formed on the catalyst during the productive phase of the reaction. My improvement has the advantage of economy of operation since it is not necessary to have an elaborate catalyst wash system, nor is it necessary to employ large quantities of some solvent, and furthermore, it is not necessary to cool down the catalyst before regeneration or purification, but the same may be charged directly to the regenerator from the reactor. A great many expedients for controlling temperatures through the catalyst regenerator and the reactor itself may be employed. For example, a portion of the catalyst may be withdrawn from reactor 1, cooled and then returned to the reaction zone. Furthermore, I have omitted showing various pumps, compressors, flow control devices, heat exchangers and other accessory equipment which are conventional, for the purpose of simplifying the description and the showing in the drawing.

Numerous modifications of my invention may be made by those who are familiar with this art without departing from the spirit thereof.

What I claim:

1. In a continuous method for synthesizing normally liquid hydrocarbons in a process in which a mixture of carbon monoxide and hydrogen is fed to a reaction zone containing a body of fluidized iron catalyst which becomes contaminated with deposits during the reaction, the improvement which comprises withdrawing a portion of fouled catalyst from a lower portion of the reaction zone, conducting it to a regeneration zone, charging an oxygen-containing gas to the regeneration zone where it contacts the catalyst maintained in the form of a fluidized mass, maintaining the catalyst in said regeneration zone for a time sufficient and at conditions adequate to effect regeneration by burning of the catalyst contaminants and to oxidize the iron of the catalyst at least in part, withdrawing regenerated and oxidized catalyst from said regeneration zone, returning catalyst so withdrawn to said reaction zone, controlling the rate of oxidized catalyst return to said reaction zone at a value of less than about 2% of the total weight of catalyst in said reaction zone, per hour, and maintaining said reaction zone at a temperature of about 600°–650° F.

2. The process of claim 1 in which said regeneration zone is of substantially smaller capacity than said reaction zone.

3. In the synthesis of hydrocarbons effected by reacting together a gasiform mixture containing hydrogen and carbon monoxide in a reaction zone containing a fluidized bed of powdered iron catalyst, the improvement comprising adding powdered iron at least partly oxidized to the reaction zone in amounts less than 2% by weight of the total catalyst in the reactor per hour.

SUMNER B. SWEETSER.

REFERENCES CITED

The following references are of record in the file of this patent:

UNITED STATES PATENTS

| Number | Name | Date |
| --- | --- | --- |
| 2,360,787 | Murphree et al. | Oct. 17, 1944 |
| 2,365,094 | Michael et al. | Dec. 12, 1944 |
| 2,389,236 | Payne | Nov. 29, 1945 |
| 2,393,909 | Johnson | Jan. 29, 1946 |

FOREIGN PATENTS

| Number | Country | Date |
| --- | --- | --- |
| 119,350 | Australia | Dec. 31, 1942 |
| 533,037 | Germany | Sept. 8, 1931 |